Patented July 7, 1931

1,813,838

UNITED STATES PATENT OFFICE

HERMAN ALEXANDER BRUSON, OF GERMANTOWN, PENNSYLVANIA, ASSIGNOR TO ROHM & HAAS COMPANY, OF PHILADELPHIA, PENNSYLVANIA

RESIN

No Drawing.  Application filed July 8, 1930. Serial No. 466,591.

This invention relates to condensation products of certain ketonic acids, notably benzophenone-2,4'-dicarboxylic acid and polyhydric alcohols such as glycerol, ethylene glycol, trimethylene glycol, and the like.

The object of this invention is to prepare new synthetic resins of greater hardness and waterproofness than are at present obtainable in the art.

It has heretofore been known that certain polybasic acids may be condensed or esterified with glycerol or other polyhydric alcohols to form resinous masses. The acids which have been used for this purpose in the past are phthalic, succinic, maleic, malic, malo-malic, diphenic, citric, tartaric, camphoric and mixtures thereof. It has been recognized however that such resins possess mediocre waterproofness, especially in the so-called "A" and "B" stages where they are still fusible, soluble materials.

Apparently the cause of the poor waterproofness is due to the nature of the polybasic acids heretofore employed for the condensation. Such acids as phthalic, succinic, citric, maleic and tartaric acids are themselves appreciably water-soluble as compared to the benzophenone-dicarboxylic acids which I propose to use; and the polyhydric esters of the polybasic acids heretofore employed are not very stable to moisture as compared with the polyhydric esters of the benzophenone-dicarboxylic acids. When condensed in open kettles with polyhydric alcohols, the polybasic acids or their anhydrides heretofore used, readily sublime out at the high temperatures required for the condensation, thereby leaving an excess of unreacted or partially esterified alcohols in the final resin, thus cutting down its waterproofness. If attempts are made to correct this loss from sublimation by adding an excess of polybasic acid, the final resin is acidic and is not water-proof due to the water solubility of the acid used.

Marked improvements result if the polybasic acid used is itself insoluble or only slightly soluble in water, if it has a higher molecular weight, and if it is relatively non-sublimable at the temperatures required for the condensation as compared with the acids heretofore employed.

In accordance with the following invention, after considerable experimentation with many different types of acids, it has now been found that polybasic acids containing a keto group and a plurality of aromatic groups meet all of the above requirements and yield resins of superior properties. It has been found that ketonic acids of the general formula

HOOC—R—CO—R'—COOH wherein R and R' are aromatic nuclei are especially effective for this purpose, and in particular the acid known as benzophenone-2,4'-dicarboxylic acid

such as is obtained by the oxidation of para-toluyl-o-benzoic acid by means of an alkaline permanganate solution.

As illustrating my invention, the following examples are given:

Example 1

The following mixture is placed in a suitable kettle equipped with an agitator and heated:

270 parts (by weight) benzophenone-2,4'-dicarboxylic acid
62 parts by weight glycerol (99%)

The heating is conducted so that the mass when molten is around 190-200° C. After 4-5 hours heating a hard resin is obtained which dissolves readily in acetone. After 8-10 hours heating this material goes over into an insoluble, infusible modification.

*Example 2*

135 parts benzophenone-2,4'-dicarboxylic acid
32 parts ethylene glycol are heated as above at 200° C. for 2-3 hours. A hard, brittle, pale resin is obtained, soluble in butyl acetate or acetone.

*Example 3*

135 parts benzophenone-2,4'-dicarboxylic acid
53 parts diethylene glycol, $OHCH_2CH_2-O-CH_2CH_2OH$ are heated with stirring for 2-3 hours at 195° C. A hard, almost colorless, resin is obtained which is soluble in acetone, butyl acetate and glycol monoethyl ether.

*Example 4*

135 parts benzophenone-4,4'-dicarboxylic acid
53 parts diethylene glycol are heated together for 3 hours at 200° C. A hard, brittle, pale resin is formed.

*Example 5*

135 grams benzophenone-2,4'-dicarboxylic acid
38 grams trimethylene glycol are heated together with stirring at 180-190° C. for 3-4 hours. A hard, brittle resin is obtained, which is soluble in acetone, butyl acetate, or glycol monoethyl ether.

*Example 6*

119 gr. benzophenone-2,4'-dicarboxylic acid
30 gr. pentaerithrite are heated together at 190-200° C. for 3 hours. An insoluble, infusible hard resin is formed.

*Example 7*

162 gr. benzophenone-2,4'-dicarboxylic acid
36.4 gr. mannitol were mixed together and heated for 2½ hours at 200° C. There is formed a brown, hard, resin, soluble in acetone.

In place of the polyhydric alcohols given above other polyhydric alcohols including polyglycerol, butylene glycol and triethylene glycol may be used in molecular equivalent amounts. Mixtures of polyhydric alcohols may likewise be employed. Other isomeric benzophenone-dicarboxylic acids or mixtures thereof may be used in lieu of benzophenone-2,4'-dicarboxylic acid as above, in like proportions. These include benzophenone-2,2'-dicarboxylic acid and the numerous benzophenone-dicarboxylic acids in which both carboxyl groups are on the same aromatic nucleus. For practical purposes, however, the 2,4'-acid gives satisfactory results. Alkylated or halogenated benzophenone-dicarboxylic acids are understood to be included herein as equivalents.

Resins produced by the above process possess high durability and waterproofness. They may be used as ingredients in coating compositions, binders and for moulding purposes. In addition they are readily soluble in and compatible with nitro-cellulose lacquers and may be used in such lacquers to give adhesion and toughness.

Although specific examples of methods for preparing the above mentioned resins have been given in detail, it is apparent that numerous and wide modifications may be made in the process without departing from its scope. For example, temperatures higher or lower than those indicated, and longer or shorter periods of heating may be used. Catalysts such as lime or magnesia may be added during the condensation to hasten the process.

What I claim is:

1. A composition of matter comprising the reaction product of glycerol and benzophenone-2,4'-dicarboxylic acid.
2. A composition of matter comprising the reaction product of diethylene glycol and benzophenone-2,4'-dicarboxylic acid.
3. A composition of matter comprising the reaction product of ethylene glycol and benzophenone-2,4'-dicarboxylic acid.
4. A composition of matter comprising the reaction product of a polyhydric alcohol and benzophenone-2,4'-dicarboxylic acid.
5. A composition of matter comprising the reaction product of glycerol and a benzophenone dicarboxylic acid.
6. A composition of matter comprising the reaction product of a polyhydric alcohol and a benzophenone dicarboxylic acid.
7. A composition of matter comprising the reaction product of diethylene glycol and a benzophenone dicarboxylic acid.
8. A composition of matter comprising the reaction product of ethylene glycol and a benzophenone dicarboxylic acid.
9. A composition of matter comprising the reaction product of glycerol and an acid having the formula

$$HOOC-R-CO-R'-COOH$$

where R and R' are benzene nuclei.

10. A composition of matter comprising the reaction product of a polyhydric alcohol and an acid having the formula

$$HOOC-R-CO-R'-COOH$$

where R and R' are benzene nuclei.

11. The process of preparing a resin which comprises heating to reaction temperature glycerol and benzophenone-2,4'-dicarboxylic acid.
12. The process of preparing a resin which comprises heating to reaction temperature glycerol and a benzophenone dicarboxylic acid.
13. The process of preparing a resin which comprises heating to reaction temperature glycerol and an acid having the formula $$HOOC-R-CO-R'-COOH$$

where R and R' are benezene nuclei.

14. The process of preparing a resin which comprises heating to reaction temperature a polyhydric alcohol and an acid having the formula $$HOOC-R-CO-R'-COOH$$

where R and R' are benzene nuclei.

In testimony whereof I affix my signature.

HERMAN ALEXANDER BRUSON.